United States Patent
Rosenblum et al.

(10) Patent No.: US 8,223,202 B2
(45) Date of Patent: Jul. 17, 2012

(54) AIRBORNE RECONNAISSANCE SYSTEM

(75) Inventors: Eliezer Rosenblum, Haifa (IL); Zvi Yavin, Gilon (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 1506 days.

(21) Appl. No.: 11/573,579

(22) PCT Filed: Aug. 14, 2005

(86) PCT No.: PCT/IL2005/000880
§ 371 (c)(1),
(2), (4) Date: Feb. 12, 2007

(87) PCT Pub. No.: WO2006/018835
PCT Pub. Date: Feb. 23, 2006

(65) Prior Publication Data
US 2007/0242135 A1      Oct. 18, 2007

(30) Foreign Application Priority Data
Aug. 16, 2004   (IL) .......................................... 163565

(51) Int. Cl.
*H04N 7/18*   (2006.01)
(52) U.S. Cl. ............................................ 348/144; 396/7
(58) Field of Classification Search ................. 348/144; 396/7
See application file for complete search history.

(56) References Cited

U.S. PATENT DOCUMENTS

| | | | |
|---|---|---|---|
| 4,900,914 A | 2/1990 | Raff et al. | |
| 4,908,705 A | 3/1990 | Wight | |
| 5,155,597 A | 10/1992 | Lareau et al. | |
| 5,668,593 A | 9/1997 | Lareau et al. | |
| 5,692,062 A | 11/1997 | Lareau et al. | |
| 6,130,705 A | 10/2000 | Lareau et al. | |
| 6,256,057 B1 | 7/2001 | Mathews et al. | |
| 2003/0185549 A1* | 10/2003 | Partynski et al. | 396/7 |
| 2004/0112962 A1* | 6/2004 | Farrall et al. | 235/462.01 |

FOREIGN PATENT DOCUMENTS

WO   WO 97/42659   11/1997

* cited by examiner

*Primary Examiner* — Joon H Hwang
*Assistant Examiner* — Joel Mesa
(74) *Attorney, Agent, or Firm* — Marsteller & Associates, P.C.

(57) ABSTRACT

The present invention relates to an airborne reconnaissance system for capturing images in a wide field of regard which comprises: (a) An array of a plurality of n prisms being one next to the other, each prism having an essentially flat and rectangular front surface, and at least an output surface wherein: (a1) a front surface of each of the plurality of prism is being directed toward a different section of a strip of terrain transversal to the flight direction of the aircraft, thereby collecting light rays coming mostly from that terrain strip section; (a2) each output surface of each of the prisms directs light rays which are received through said front prism surface toward a front lens of an optical unit; (b) A focal plane array; (c) Optical unit comprising a front lens, the front lens receiving light separately but simultaneously through the output surfaces of all the prisms, said optical unit comprises addition optics for directing the light received from said lens thereby to produce separate corresponding prism images on said focal plane array; (d) Control unit for periodically capturing all the images that are produced on the focal plane array at each instant, and transferring them into an electronic storage; and (e) Processing and combining unit for processing and combining all the separate stored prism images into a full image of the terrain relating to said wide field of regard.

5 Claims, 10 Drawing Sheets

AIRBORNE RECONNAISSANCE SYSTEM

FIELD OF THE INVENTION

The field of the present invention relates to a system for carrying out airborne reconnaissance. More particularly, the present invention relates to an airborne reconnaissance system which can obtain images in a wider field of view in comparison with similar prior art systems, without sacrificing the images resolution. Furthermore, the system of the present invention obtains such a wider field of view with no use of gimbals, or any other equivalent dynamic mechanical system for changing the direction of the field of view.

BACKGROUND OF THE INVENTION

Airborne reconnaissance systems have been widely used for many years now, particularly for obtaining images from the air of areas of interest.

Originally, a film camera was used on board of the aircraft for capturing images of the terrain. The main problem of an airborne, film-camera based reconnaissance system is the length of time required for developing the film, an operation that can be performed only after landing. This problem has been overcome in more modern systems by the use of a one-dimensional vector or a two-dimensional array of light-sensitive sensors (generally such an array is called a "focal plane array" hereinafter also referred to as FPA) in the camera for obtaining electronic images that are then electronically stored within the aircraft, and/or transmitted to a ground base station. This is generally done in such systems by scanning the area of interest.

Airborne reconnaissance systems are generally used to obtain images of hostile areas, and therefore the task of obtaining such images involves some particular requirements, such as:

1. Flying the aircraft at high altitude and speeds in order to reduce the risk of being targeted by enemy weapons, and in order to widen the area captured by each image;
2. When carrying out reconnaissance in low height and/or high speed (i.e., a high V/H ratio), trying not to compromise the image quality.
3. Trying to capture as much relevant image information as possible during as short as possible flight time;
4. Trying to operate under various visibility conditions, while not compromising the resolution of the images and their quality.

The need for securing the reconnaissance aircraft, while flying above or close to hostile areas, has significantly increased flying costs and risks, as sometimes the reconnaissance mission requires escorting of the aircraft by other, fighter aircrafts. Therefore, the need for enabling a short and reliable mission is of a very high importance.

There are several other problems generally involved in carrying out airborne reconnaissance. For example, capturing images from a fast-moving aircraft introduces the need for the so-called Forward Motion Compensation (Hereinafter, the term "Forward Motion Compensation" will be shortly referred to as FMC), to compensate for aircraft movement during the opening of the camera shutter (whether mechanical or electronic; in the latter case, the opening of the camera shutter for the purpose of exposure is equivalent to the integration of light photons by the light-sensitive components).

When light-sensitive sensors are used in the camera, three major scanning types are used:

i. The Along-Track Scanning (also known as "push-broom scanning")—In a first configuration of the Along-Track Scanning, the light-sensitive sensors are arranged in a one-dimensional vector (row), perpendicular to the flight direction. The scanning of the imaged area is obtained by the progression of the aircraft. In one specific configuration of Along-Track Scanning, generally called Along-Track TDI (Time Delayed Integration) configuration, a plurality of such parallel one-dimensional vectors (pixel-rows) perpendicular to the flight direction are provided at the focal plane forming a two-dimensional array. In that case, however, the first row of the array captures an area strip, while the subsequent rows are used to capture the same strip, but at a delay dominated by the aircraft progression. Then, for each row of pixels, a plurality of corresponding pixels of all the rows in the array, as separately measured, are first added, and then averaged in order to determine the pixel measured light intensity value. More particularly, each pixel in the image is measured N times (N being the number of rows) and then averaged. This Along-Track TDI configuration improves the signal-to-noise ratio.

ii. The Across-Track Scanning (also known as "Whiskbroom Scanning")—In the Across-Track Scanning, a one-dimensional sensing vector of light-sensitive sensors, arranged parallel to the flight direction, is used. The camera including the sensing vector is positioned on gimbals having one degree of freedom, which, during the flight, repeatedly moves the camera right and left in a direction perpendicular to the direction of flight, while always keeping the vector in an orientation parallel to the direction of flight. Another Across-Track Scanning configuration uses a moving mirror or prism to sweep the line of sight (hereinafter, LOS) of a fixed vector of sensors across-track, instead of moving the whole camera. Another configuration of the Across-Track Scanning is the Across-Track TDI configuration. In this configuration there exists a plurality of vectors (columns) in a direction parallel to the flight direction, forming a two-dimensional array. This Across-Track TDI, in similarity to the Along-Track Scanning TDI, provides an improved reliability in the measuring of pixel values, more particularly, an improvement in the signal-to-noise ratio.

iii. Digital Framing Scanning: In Digital Framing Scanning, a two-dimensional array of light-sensitive sensors is positioned with respect to the scenery. In U.S. Pat. No. 5,155,597 and U.S. Pat. No. 6,256,057 the array is positioned such that its column-vectors (a column being a group of the array's columns) are parallel to the flight direction. Forward motion compensation (FMC) is provided electronically on-chip (in the detector focal plane array) by the transferring of charge from a pixel to the next adjacent pixel in the direction of flight during the sensor's exposure time (also called "integration time"). The charge transfer rate is determined separately for each column (or for the whole array as in U.S. Pat. No. 6,256,057 where a slit is moved in parallel to the columns direction), depending on its individual distance (range) from the captured scenery, assuming flat ground. In WO 97/42659 this concept is extended to handle transferring of charge separately for each cell instead of column, a cell being a rectangular group of pixels. In the system of U.S. Pat. No. 5,692,062, digital image correlation between successive frames captured by each column is performed, in order to measure the velocity of the scenery with respect to the array, and the correlation result is used for estimating the average range of each column to the scenery, for the purpose of motion compensation in terrain with large variations. This compensation method requires capturing of three successive frames for each single image, two for the correlation process and one for the final motion-compensated frame. The system of U.S. Pat. No. 5,668,593 uses a 3-axis sightline stepping mechanism for expanding coverage of the area of interest, and it applies a motion compensation technique by means of transferring of charge along columns. U.S. Pat. No. 6,130,705 uses a zoom lens that automatically varies the camera field of view based on passive range measurements obtained from digital image correlation as described above. The field of view is tuned in accordance with prior mission requirements for coverage and resolution.

A significant problem which is characteristic to all the above types of prior art reconnaissance systems is their limited field of view. Generally, the prior art systems comprise a lens at the front of the imaging system, which impinge the image onto a focal plane array through some more optical means. The lens generally has a limited field of view, in a typical range of up to 30°. Any attempt to increase the field of view results in a significant reduction in the resolution of the captured image. Therefore, when there is a need to obtain high resolution images in a wide field of regard with the prior art systems having a limited field of view, most such systems need a scanning mechanism, for repeatedly scanning the terrain perpendicular to the flight direction.

Another recent prior art reconnaissance system for a low altitude and wide coverage (about 180°), such as the one known as IRLS (Infra Red Line Scanner), uses a focal plane array which is fixed to the aircraft structure (not gimbaled). The terrain scanning perpendicular to the flight direction is made using a rotating prism which located in front of the camera.

Hereinafter, the term "field of regard" refers to the spatial section within which the camera line of sight can be directed without obscuration. In such a manner, the field of regard was increased up to 180°. However, such an approach requires a very expensive, heavy, and complicated mechanism. Moreover, such mechanical scanning could have been performed at a limited rate due to its structure, and in order to fully scan the area as required, the maximal flight velocity of the aircraft was limited. This limitation of the flight velocity is a very significant drawback, as reconnaissance missions are generally performed over enemy territory.

Still a significant drawback of reconnaissance systems of the prior art, for example, U.S. Pat. No. 5,155,597, U.S. Pat. No. 5,692,062, WO 97/42659, U.S. Pat. No. 6,130,705, and U.S. Pat. No. 6,256,057 is their limited ability to capture images in a wide range of a field of regard. Systems of the prior art sometimes use several dedicated systems for different sight directions (e.g. a separate system for down-looking, and others for side-oblique looking), which significantly increase the cost and weight of the whole reconnaissance system. The present invention provides to the aircraft the ability of capturing relatively high resolution images with single focal plane array, simultaneously from a wide field of regard (generally down and sideways of the aircraft) with no need for a mechanical scanning mechanism for changing the direction of sight.

It is therefore an object of the present invention to provide an airborne reconnaissance system capable of obtaining relatively high resolution and reliable images of the terrain, within a very wide field of regard.

It is still another object of the invention to eliminate the need for any mechanism for changing the direction of the camera line of sight, while still maintaining image capturing in a very wide field of regard, therefore increasing the reliability of the reconnaissance system.

It is still another object of the present invention to make the system of the present invention compact, enabling it to be accommodated within a limited volume compartment attached to the aircraft.

Other objects and advantages of the present invention will become apparent as the description proceeds.

SUMMARY OF THE INVENTION

The present invention relates to an airborne reconnaissance system for capturing images in a wide field of regard, which comprises: (a) An array of a plurality of n prisms being one next to the other, each prism having an essentially flat and rectangular front surface, and at least an output surface wherein: (a1) a front surface of each of the plurality of prisms being directed toward a different section of a strip of terrain transversal to the flight direction of the aircraft, thereby collecting light rays coming mostly from that terrain strip section; (a2) each output surface of each of the prisms directs light rays which are received through said front prism surface toward a front lens of an optical unit; (b) A focal plane array; (c) Optical unit comprising a front lens, the front lens receiving light separately but simultaneously through the output surfaces of all the prisms, said optical unit comprises additional optics for directing the light received from said lens thereby to produce separate corresponding prism images on said focal plane array; (d) Control unit for periodically capturing all the images that are produced on the focal plane array at each instant, and transferring them into an electronic storage; and (e) Processing and combining unit for processing and combining all the separate stored prism images into a full image of the terrain relating to said wide field of regard.

Preferably, the front surface of each prism is directed to a different view direction.

Preferably, each prism has a triangular shape.

Preferably, a third surface of each prism reflects toward the output surface of that prism light which is received into the prism through said front surface.

Preferably, the light impinged on said n prism produces at each instance n separate images on said focal plane array, each corresponds to one prism.

Preferably, cross-talk between any two of said separate images which are produced on the focal plane array is eliminated by ignoring portions of the focal plane array at locations between the separate images.

Preferably, the front lens and the additional optics of the optical unit form an asymmetric optics, having a different optical activity along a first axis of a terrain strip to which a prism is directed than along a second axis of said terrain strip.

Preferably, the first axis of the terrain strip is the axis transversal to the flight direction, and corresponds to the longer side of the rectangular front surface of the prism directed to that strip.

Preferably, the second axis of the terrain strip is the axis along the flight direction, and corresponds to the shorter side of the rectangular front surface of the prism directed to that strip.

Preferably, the optical path of the asymmetric optics has an entrance pupil relatively close to the output surfaces of the prisms along its first axis, and the optical path of the asymmetric optics has an entrance pupil relatively far from the output surfaces of the prisms along its second axis.

Preferably, the additional optics comprises two or more asymmetric optical elements.

Preferably, the asymmetric optical activity is obtained due to a difference in the curvature of the elements surfaces along two of their axes.

Preferably, the asymmetric optical elements are cylindrical lenses.

Preferably, the system further comprises one or more folding mirrors.

DETAILED DESCRIPTION OF PREFERRED EMBODIMENTS

As said, an object of the airborne reconnaissance system of the present invention is to increase the rate of capturing of terrain images, in a wide field of regard while eliminating the mechanism for changing the view direction of the camera, while still maintaining relatively high image resolution. The invention is particularly useful for carrying out reconnaissance in conditions when the rate V/H is high.

Figure 1:
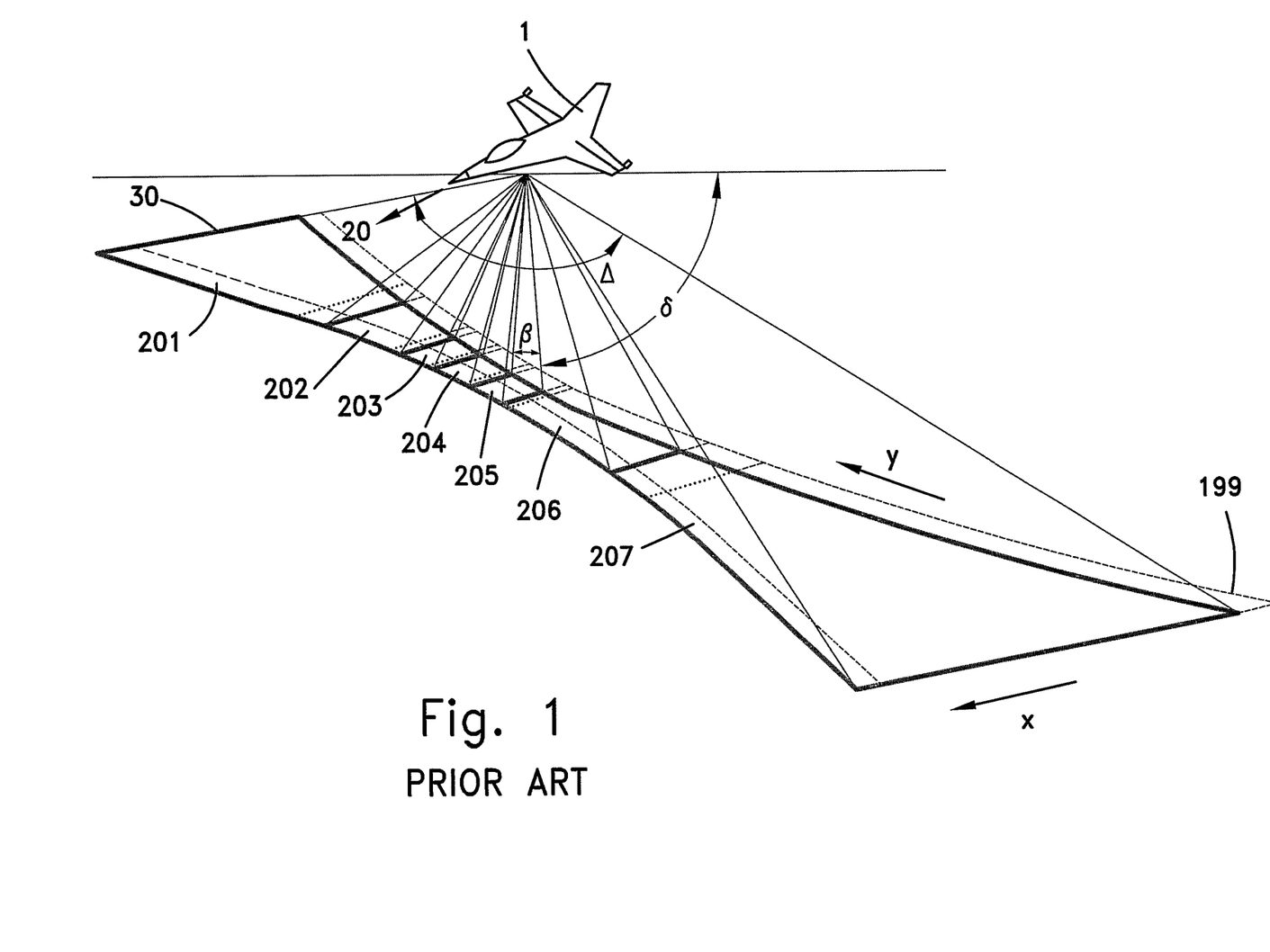
FIG. 1 shows a typical airborne reconnaissance system of the prior art.

A typical airborne reconnaissance system of the prior art is shown in FIG. 1. Aircraft 1, provided with an imaging system (not shown) flies in a direction as marked by arrow 20. The imaging system generally comprises a camera for capturing images of terrain 30. Such a camera briefly comprises optics, some type of sensing means such as a focal plane array, and images storage, generally digital storage for storing the captured images. The optics of the system, and the sensing means (generally in a form of a focal plane array) are typically mounted on gimbals mechanism which changes the line of sight (i.e., the view direction) of the camera during the flight perpendicular to the direction of flight. While changing the view direction (angle θ), the camera captures a plurality of images, such as images 201-207, forming a strip of distinct images, that may somewhat overlap (hereinafter, a "strip" of images which is resulted from such perpendicular change of direction will also be referred to as a "transversal" strip). By using such gimbals mechanism, the camera can scan a larger field of regard in comparison with a static camera, while the resolution of the images is essentially maintained in all the directions.

For example, in a system of the prior art, such as the one shown in FIG. 1, the field of view angle β of the camera is typically in the order of about 20°. An increase of the field of view will result in reduction of the image resolution. In order to scan a transversal wide strip of images such as the one including images 201-207 of FIG. 1, the gimbals mechanism sequentially changes the angle θ in a stepwise manner, while, in each step, one image from the strip including images 201-207 is captured. Then, the procedure is similarly repeated for a next sequence of images in a similar manner. In FIG. 1, the strip area shown by dotted line indicates a previous scanning sequence of an area strip, and those shown by bold lines indicate a present scanning sequence. A next scanning sequence is not shown, but it is similar to said two sequences. It can be seen that there is overlap between the strips in the direction of the airplane progression. In the prior art system, any try to increase the camera field of view angle β (hereinafter, the camera field of view angle, will be also referred to as CFOV) has resulted in a reduction in the image resolution. Therefore, the selection of the camera field of view β is essentially a compromise evolving from the wish to have as high as possible image resolution on one hand, and the wish to cover by each image as large as possible terrain area on the other hand. The use of gimbals mechanism for changing the field of view direction transversally to the flight direction is the solution developed in order to overcome this limitation of the relatively narrow CFOV.

Another factor which is known to limit the rate of acquiring terrain images is the factor of the ratio between the aircraft velocity to its height –V/H. More particularly, it is known that the higher this factor is, the lower the resulted image resolution is. When carrying out reconnaissance in low height and high aircraft velocity, this ratio factor is high. Therefore, the acquiring of images in a large transversal field of regard (for example angle Δ of up to 180°—see FIG. 1), requires a very high rate of changing the view direction angle θ. Maintaining such a high rate of changing θ, in a high degree of accuracy, while still needing to "freeze" the system while capturing an image is limited by the mechanism capability, and by the requirement for high resolution. Of course, the field of regard may be divided between two or more cameras that may be simultaneously used. However, this is an expensive solution, which also adds weight to the aircraft and may not fit into the volume limitation.

Figure 2:
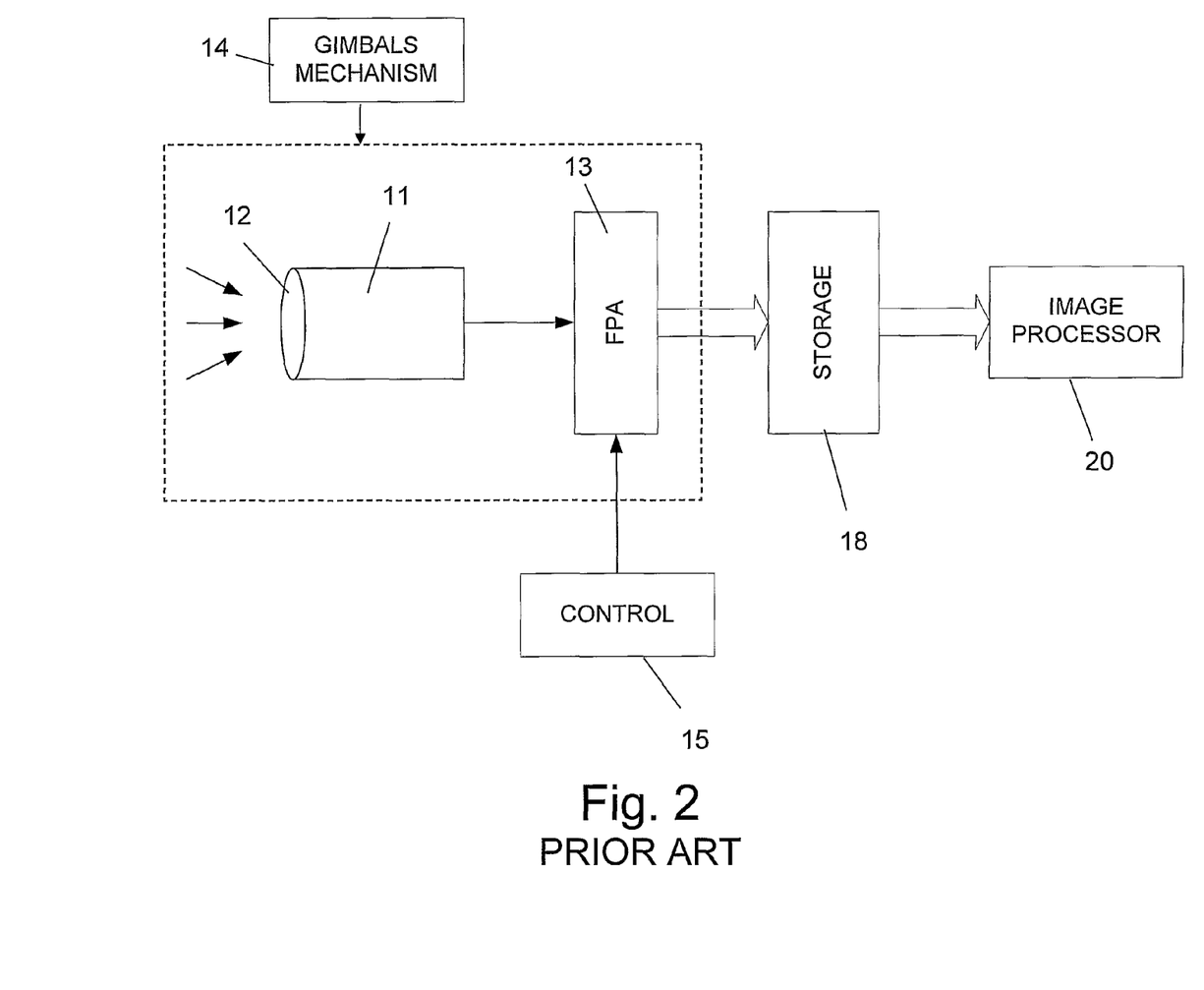
FIG. 2 is a general block diagram describing an airborne reconnaissance system, based on a focal plane array detector, according to the prior art.

FIG. 2 is a general block diagram describing an airborne reconnaissance system, based on a focal plane array detector, according to the prior art. The system comprises an optical unit 11, having a front lens 12. The optical unit 11 is generally limiting the field of view to the order of up to 30° in order to have sufficient resolution. An image which is seen by the optical unit 11 is impinged on a focal plane array 13. In order to increase the field of regard of the camera, the optical unit 11 and the focal plane array are mounted on gimbals mechanism 14, which changes the field of view direction transversal to the aircraft progression. Sensor control unit 15 periodically activates capturing of the images which are sensed by the focal plane array, and said images are conveyed sequentially to electronic storage 18. Whenever necessary, the images, or more particularly, raw image data, which is stored in storage 18 is conveyed to an image processor 20, that processes the data, and produces processed reconnaissance images.

Figure 3:
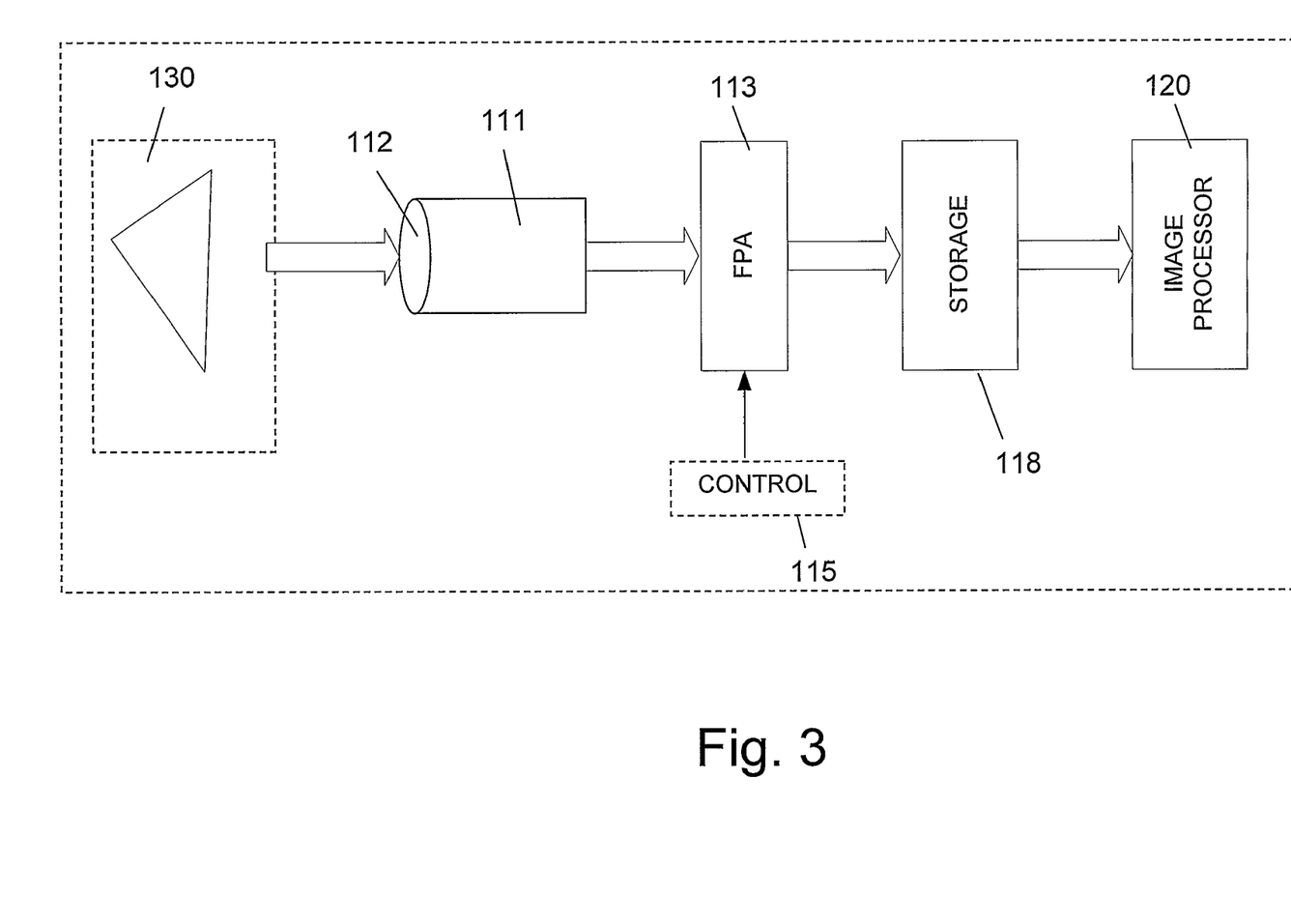
FIG. 3 generally illustrates in a block diagram form the structure of the system of the present invention.

A general block diagram illustrating the system of the present invention is given in FIG. 3. As before, the system comprises an optical unit 111 with front lens 112 essentially having the same field of view as the optical unit 11 having a front lens 12 of the prior art system of FIG. 2, in order to get similar resolution. The system also comprises a focal plane array, 113, and storage 118, similar to the corresponding units 13, and 18, of the prior art system of FIG. 2. The system of the present invention, however, additionally comprises an array of prisms 130, which does not exist in the prior art system of FIG. 2.

Furthermore, the system of the present invention does not require any gimbals mechanism such as gimbals 14 of the prior art, or any similar mechanism for changing the camera line of sight (the term "camera" when used herein, is equivalent to the term "imaging unit" which is also used in this application). Also, the image processing unit 120 of the present invention operates in quite a different manner than the image processing unit 20 of the prior art, as will be described in more detail hereinafter.

Figure 4:
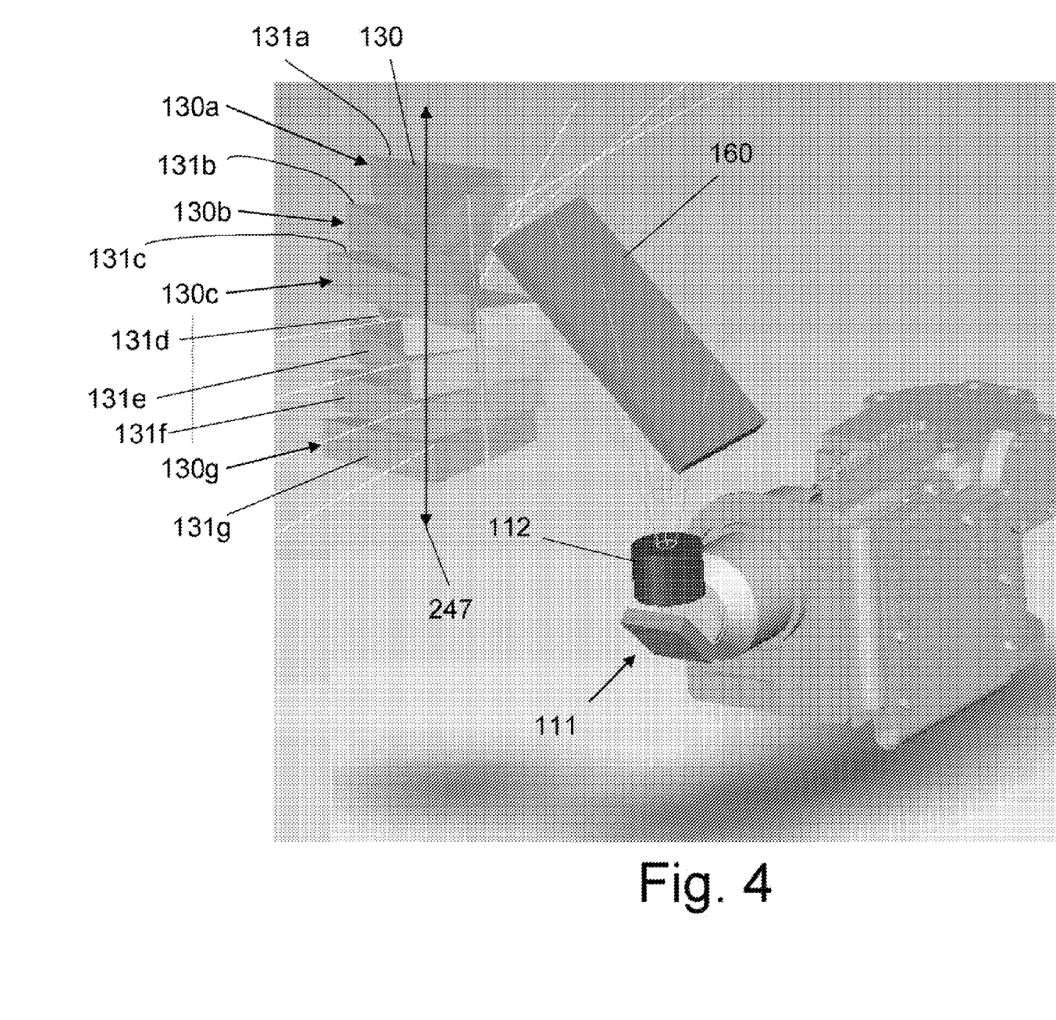
FIG. 4 illustrates the general mechanical structure of the system of the present invention.
Figure 7:
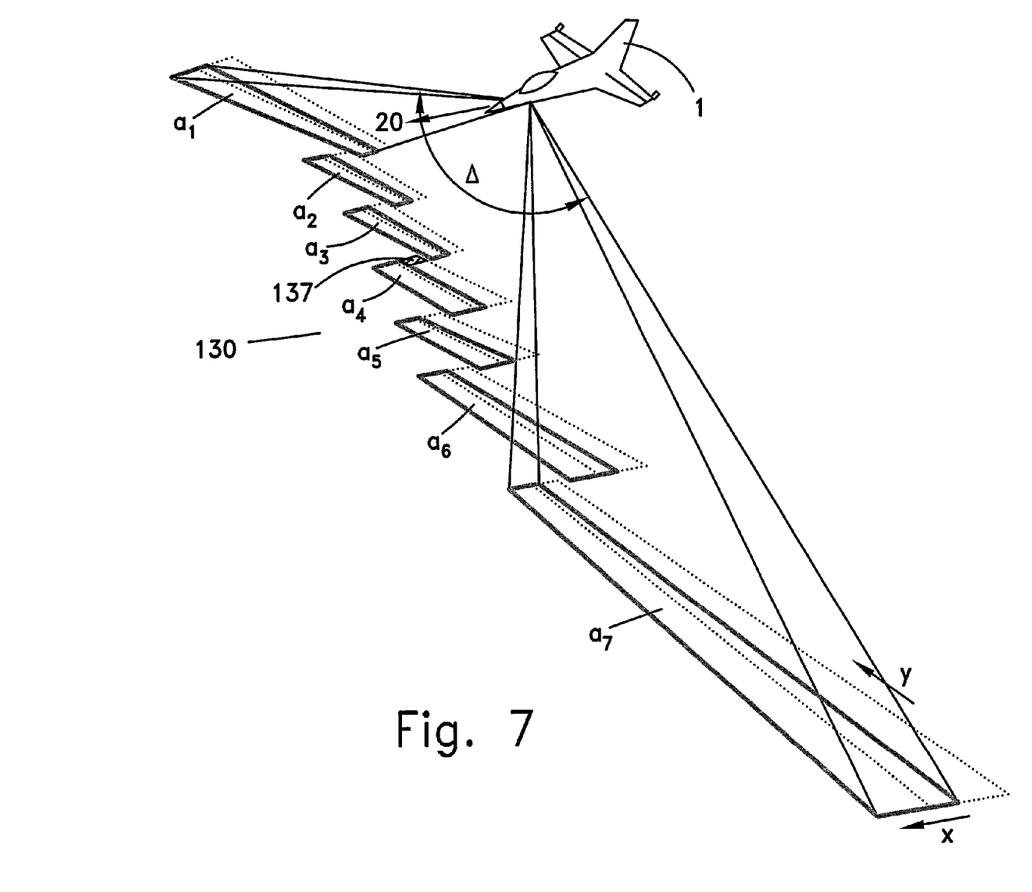
FIG. 7 illustrates how images of the terrain are obtained by the system of the present invention.
Figure 8:
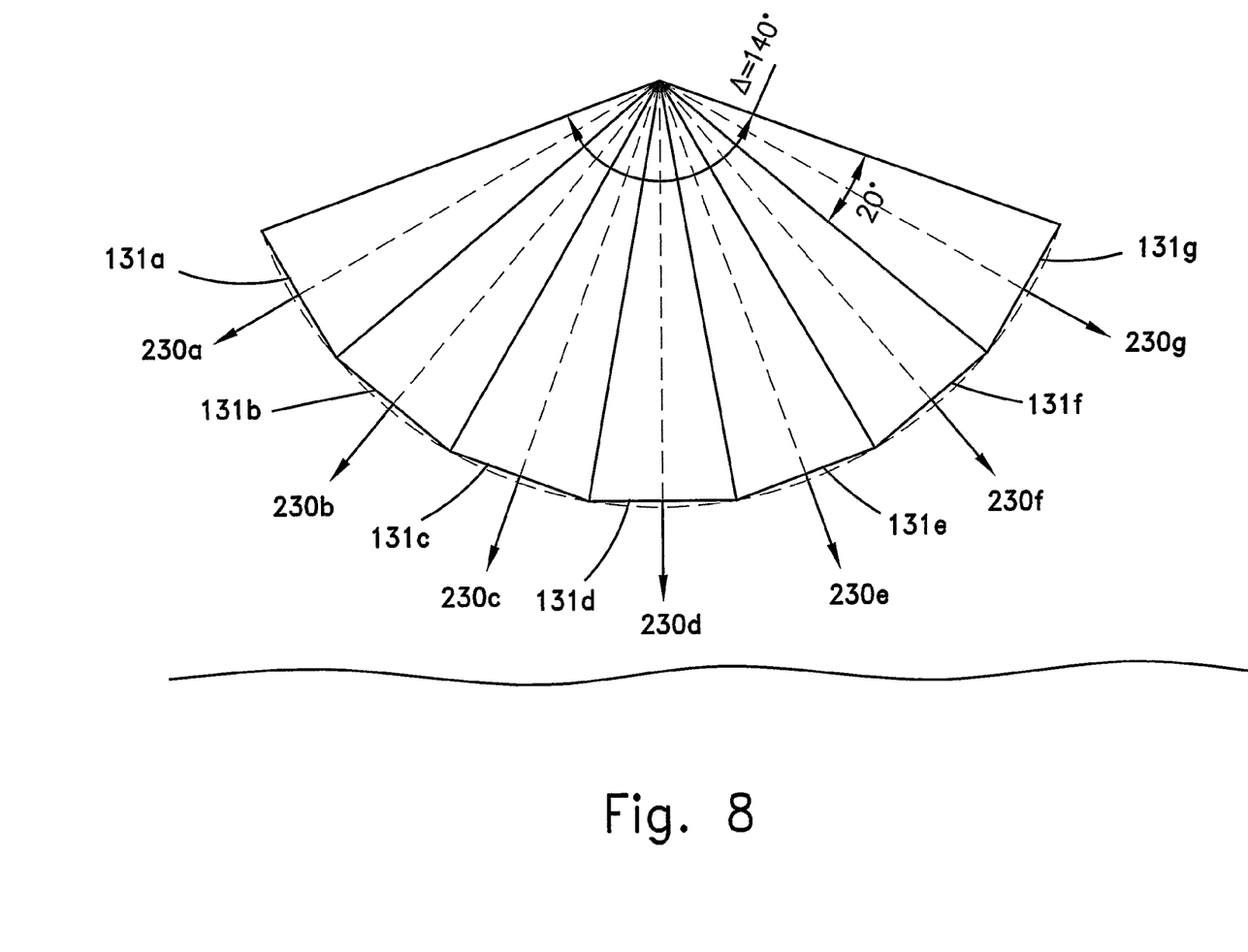
FIG. 8 simulates how each prism of the prisms array covers another section of a terrain "strip" transversal to the aircraft flight direction.

FIG. 4 illustrates the general mechanical structure of the system of the present invention. FIG. 7 illustrates how images of the terrain are obtained. The array of prisms 130 comprises a plurality of prisms 130a-130g that are arranged one next to the other as shown. The exemplary array of FIG. 4 includes seven prisms, but a different number of such prisms may be used. Each of the prisms 130a-130g has one essentially flat side 131a-131g respectively, which faces the scenery, and such side is referred herein as the "front side", or "front surface" of the prism. The total transversal field of regard spanning the angle Δ (for example, the "strip" comprising of images $\alpha_1$-$\alpha_7$ as of FIG. 7) is composed of the transversal field of views observed through all the available prisms 130. For example, if the camera in the system of the invention has a total of 140° transversal field of regard (angle Δ of FIG. 7 and FIG. 8), and there are available seven prisms, the camera looking through the first prism may cover angle between (−70)°-(−50)°, the camera looking through the second prism may cover angle between (−50)°-(−30)°, the camera looking through the third prism may cover angle between (−30)°-(−10)°, . . . etc., and the camera looking through the seventh prism may cover angle between (+50)°-(+70)°. Therefore, each prism's front side receives light beams mostly from another portion of the transversal field of regard (i.e., each prism covers another section of the terrain "strip" transversal to the aircraft flight direction). FIG. 8 simulates this situation as seen from in front of the aircraft (although not to the real scale). The transversal field of regard Δ, in this case spans 140°. It can be seen that each of the prisms essentially "stares" to another planar direction 230a-230g respectively, and therefore "sees" another portion of a transversal portion of terrain 30.

It should be noted that there is preferably some transversal overlapping between terrain sections covered by different prisms, so that a portion of a same section of the terrain is seen through two prisms though not at the same time. Such an overlap is, for example, the area indicated by numeral 137 in FIG. 7. This "overlap" generally helps in "suturing" the full, large terrain image from the various portion images. It should be further noted that the total transversal field of regard Δ does not necessarily have to be divided evenly between the prisms.

The light beams passing through the various prisms are directed toward front lens 112 (see FIG. 4) and the optics which follows 111, either directly, or optionally by means of folding mirror (or mirrors) 160. The light beams, after passing through optics 111, impinge on focal plane array 113 (not shown in FIG. 4).

Figure 5:
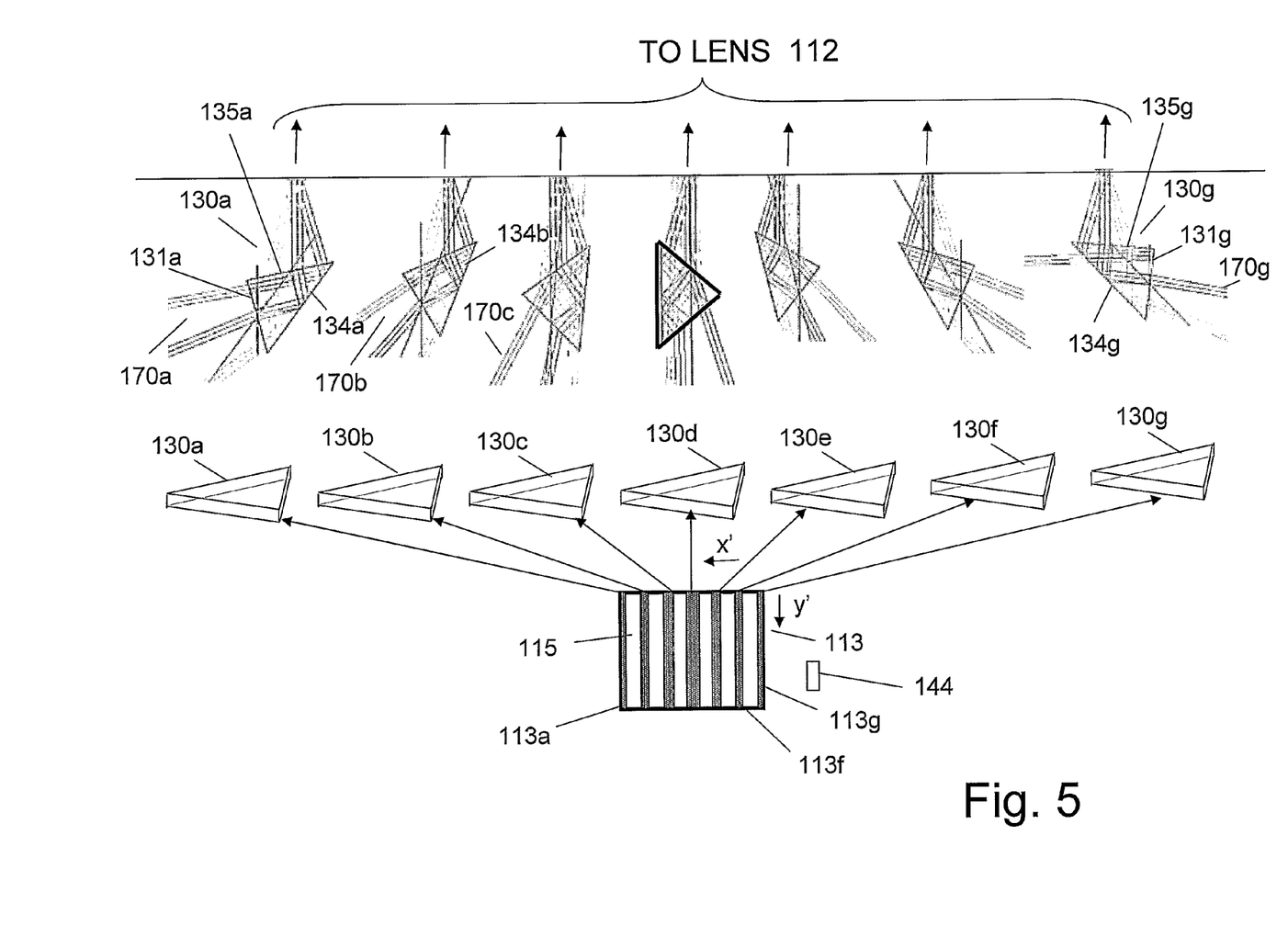
FIG. 5 is a spread out scheme of the prisms array used in the present invention, also showing the corresponding images as produced at the focal plane array.

FIG. 5 is a spread out scheme of the prisms array, also showing the corresponding images as produced at the focal plane array 113. The upper illustration of prisms 130a-130g shows that the front side 131a-131g respectively of each prism 130a-130g is directed to a different direction in order to cover a different section ($\alpha_1$-$\alpha_7$) of the transversal terrain strip. Each prism diverts the light which is impinged on its front side 131a-31g respectively toward lens 112 of optics 111. As shown, for each prism 130a-130g the light which enters that prism is reflected by reflecting prism surface 134a-134g respectively towards respective output surface 135a-135g, leaving the prisms array and entering the optical unit 111 through its front lens 112. As said the optical unit 111 and focal plane array 113 may be conventional as in the prior art. Therefore the light rays which enter the optical unit 111 are led toward focal plane array 113 (shown schematically in FIG. 5) in a conventional manner. The light beams produce on focal plane array 113 separate strip images 113a-113g, each strip image corresponds to one prism 130a-130g, and represents one of the terrain sections $\alpha_1$-$\alpha_7$ indicated in FIG. 7. In FIG. 5, most of each white region 115 within the focal plane array 113 is a region of crosstalk (between adjacent prisms) that are preferably ignored. As shown in FIG. 5, the widths (in the direction of x', which corresponds to the terrain direction x—see FIG. 7) of all the strip images 113a-113g are not identical, and they become narrower when they relate to prisms that are away from the prisms array center (in our case, the prism array center is the center of prism 130d). This different width is in fact a matter of choice preferably done in the present invention. The farther from the prism array center (i.e., from prism 130d) the specific prism is positioned, the larger the terrain strip width (i.e., the terrain strip width in the direction x (see FIG. 7) that this prism "collects" light from). Therefore, identical width of strip images (i.e., in the direction of x'—see FIG. 5) on FPA 113 represent wider terrain (i.e., in the direction of x—FIG. 7) when collected through prisms away from the center of the prism array. In order to represent by all image strips a same width of terrain area, the strip images on array 113 that are away from the center are selected by definition to be narrower. This is, as said, a matter of selection.

A very important aspect of the present invention that should be noted is the fact that the resolution of all the strip images 113a-113g that are produced at FPA 113 is dominated by optics 111. As this optics may be essentially the same as the optics 11 which is used by the prior art, also the image resolution for all the strips remains the same as in the prior art. However, as explained, each full FPA image (i.e., the FPA image including all the strips 113a-113g that are produced at FPA 113 at a specific instantaneous time) represents a terrain strip spanning a very large field of regard, up to 180°, for example the terrain strip 130 comprising separate strips $\alpha_1$-$\alpha_7$ shown in FIG. 7. Most importantly, all the images relating to the separate strip images $\alpha_1$-$\alpha_7$ covering a very large field of regard are collected in one instance, and without any mechanism for changing direction of the camera line of sight as in the prior art.

As demonstrated, the invention enables the obtaining of a full strip image representing a very large transversal field of regard at one instance without any mechanism for changing the direction of the camera line of sight (i.e., without changing angle θ as in FIG. 1).

The invention as described so far can operate in a satisfactory manner. However, the general structure of the invention as described in FIGS. 4, 5, 7, and 8 may occupy a relatively large volume, which is not always available in aircrafts. More particularly, this issue concerns where to position the entrance pupil of the system. The entrance pupil is a virtual stop to the light beams, well known in the art, which exists essentially in any optical system. In the present invention, an important object is to minimize the size of the prisms. To obtain this object, it is necessary to design the optics in such a manner that the entrance pupil of the optical unit is located close to the prisms exit sides (or surfaces facing the optical unit) 135a-135g in FIG. 5 respectively. Another object is to provide a good separation between light beams oriented along longitudinal axis 247 of the prisms array (in FIG. 4) and focused at the FPA as separated strips, in order to eliminate cross talk between objects "seen" through the prisms. This requires designing the entrance pupil far from the prisms exit sides (or surfaces) 135a-135g. A preferred embodiment of the present invention provides a solution to these two conflicting requirements.

According to the most preferred embodiment of the present invention, the optics within optical unit 11 is designed to be asymmetric. This is necessary for reasons to be explained later in order to get the entrance pupil far away from the prisms array with respect to a first of the prism array axis, and close to the prism array along a second axis, perpendicular to said first axis. In one embodiment, the optics is designed such that the object (terrain strip) image is magnified by the optics more along its y axis (see FIG. 7) than along its x axis. In other words, if in a theoretical case the optics views a square object within the terrain, after passing the optics this theoretical object will be formed rectangular at the FPA as illustrated by image 144 (FIG. 5). However, it should be noted that the said desired asymmetric optical unit can be obtained with same magnification with respect to said two axes. Such asymmetric magnification is obtained in the preferred embodiment of the invention by means of using cylindrical or similar optical surfaces that have curvature and therefore optical activity along one axis, but no curvature and therefore no optical activity along the other axis. In such a manner the entrance pupil corresponding to the optical activity of the unit along the y axis of the terrain can be located close to the exit surfaces 135a-135g of the prisms, whereas the entrance pupil relating to the optical activity along the x axis of the terrain is located far from the exit surfaces 135a-135g of the prisms. Therefore, the prisms can have relatively small dimensions at one plane, while along the perpendicular axis 247 (FIG. 4) one gets the adequate separation between light beams coming from different terrain strips. In an embodiment of the invention using asymmetric elements the size of the prisms T, one plane was reduced to 30-40 mm, while with a symmetric optical unit this would be about 150 mm.

The asymmetry which is caused by the optics is corrected at the image processing level by image processor 120 (FIG. 3) in a conventional manner.

Figure 9:
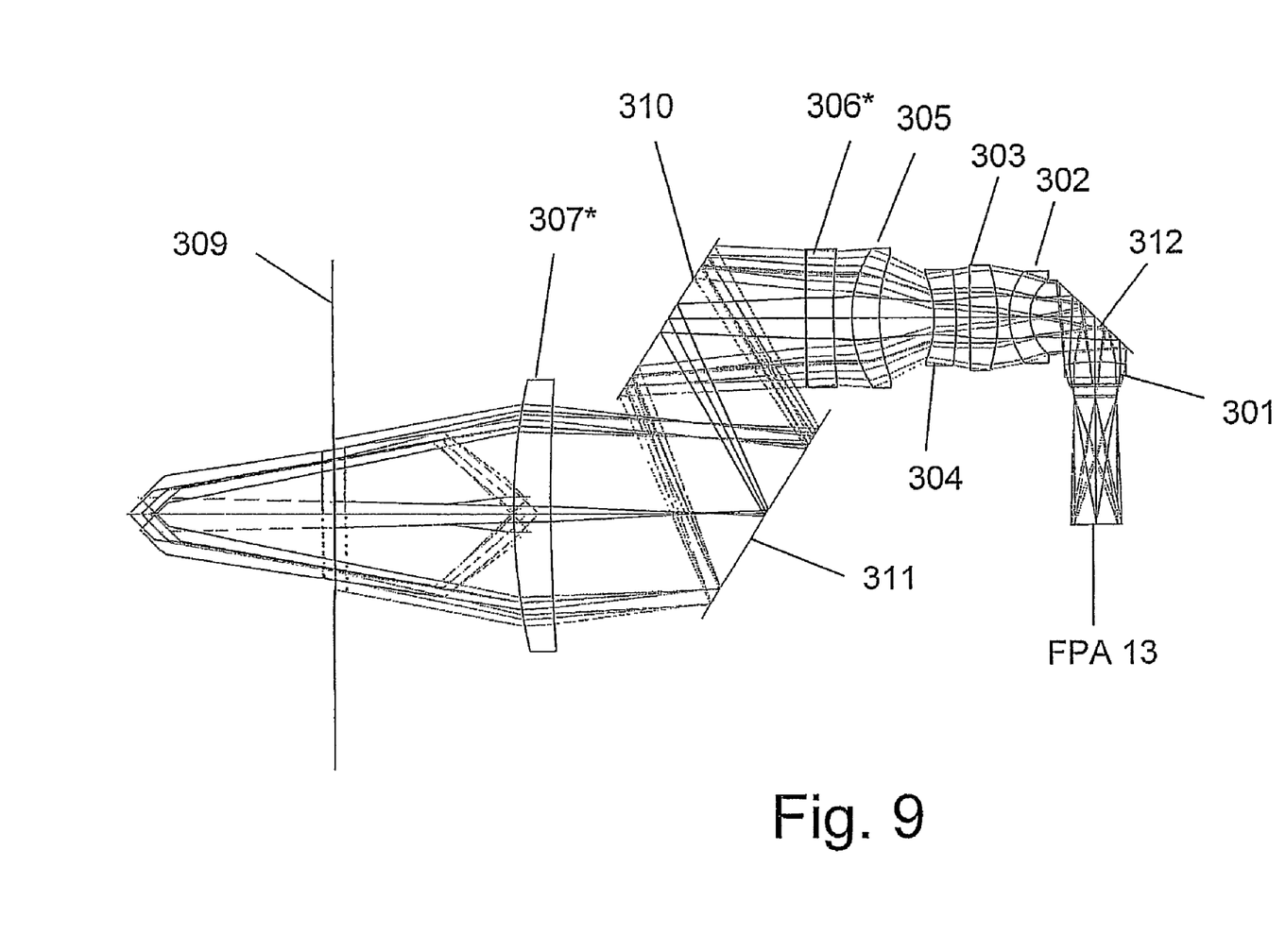
FIGS. 9 and 10 are longitudinal top and side views illustrating the optical path within the optical unit and the focal plane array according to an embodiment of the invention
Figure 10:
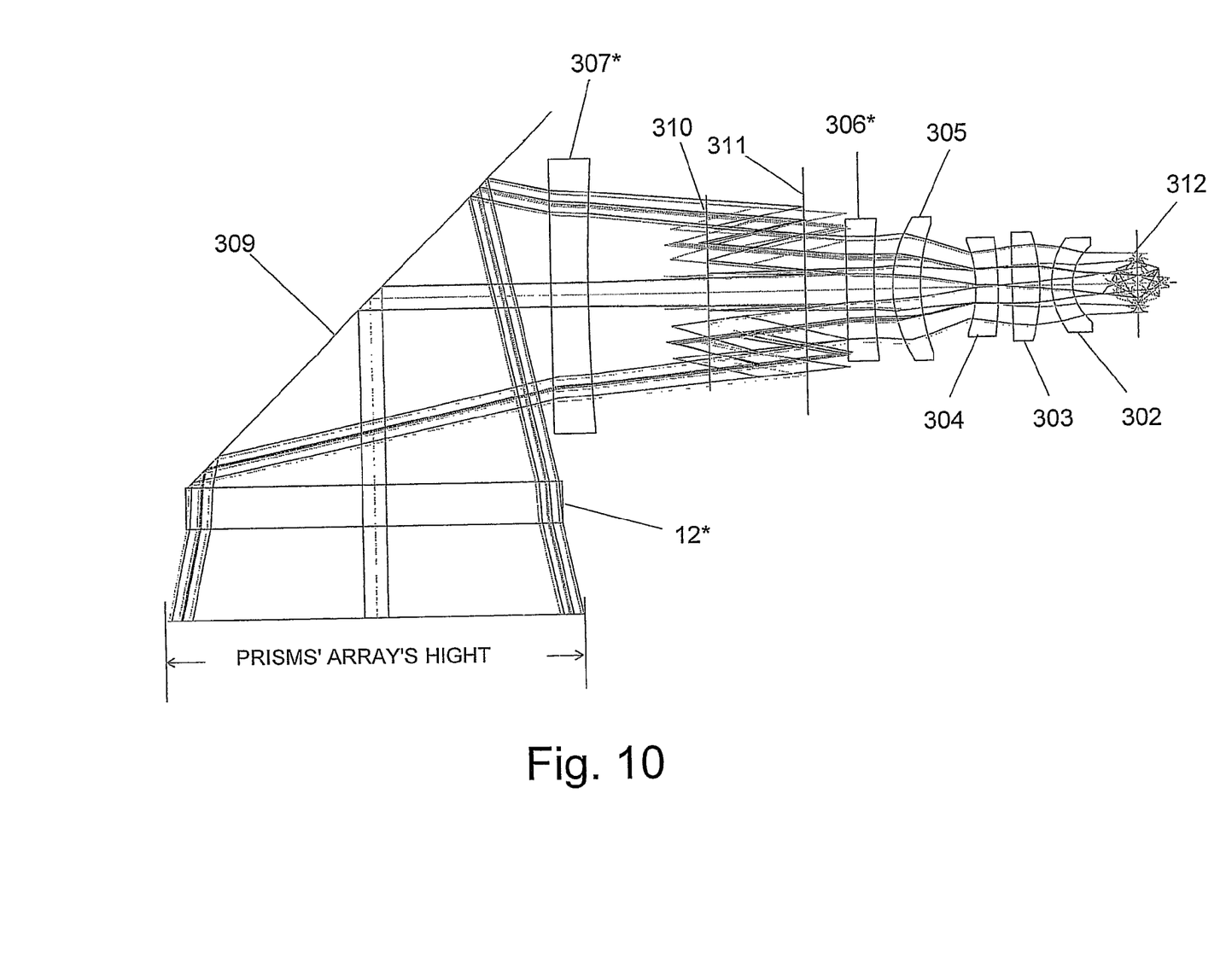

FIGS. 9 and 10 show two longitudinal top and side views illustrating the optical path within optical unit 11 and FPA 113 according to an embodiment of the invention. The FPA is indicated by numeral 13. Elements 301, 302, 303, 304, 305, 306, 307, and 12 are lenses, wherein lenses 306, 307, and 12 which are marked by (*) are asymmetric lenses. Elements 309, 310, 311, and 312 are folding mirrors. FIG. 9 illustrates the optical activity of the unit along said y axis of the terrain, showing also that the entrance pupil (of the optical unit) is located close to the prisms array (as mentioned above). FIG. 10, on the other hand, illustrated the optical activity of the unit in the perpendicular plane (along said x axis of the terrain), showing also that the entrance pupil (in this plane) is located far from the prisms' array (as also mentioned above).

Figure 6:
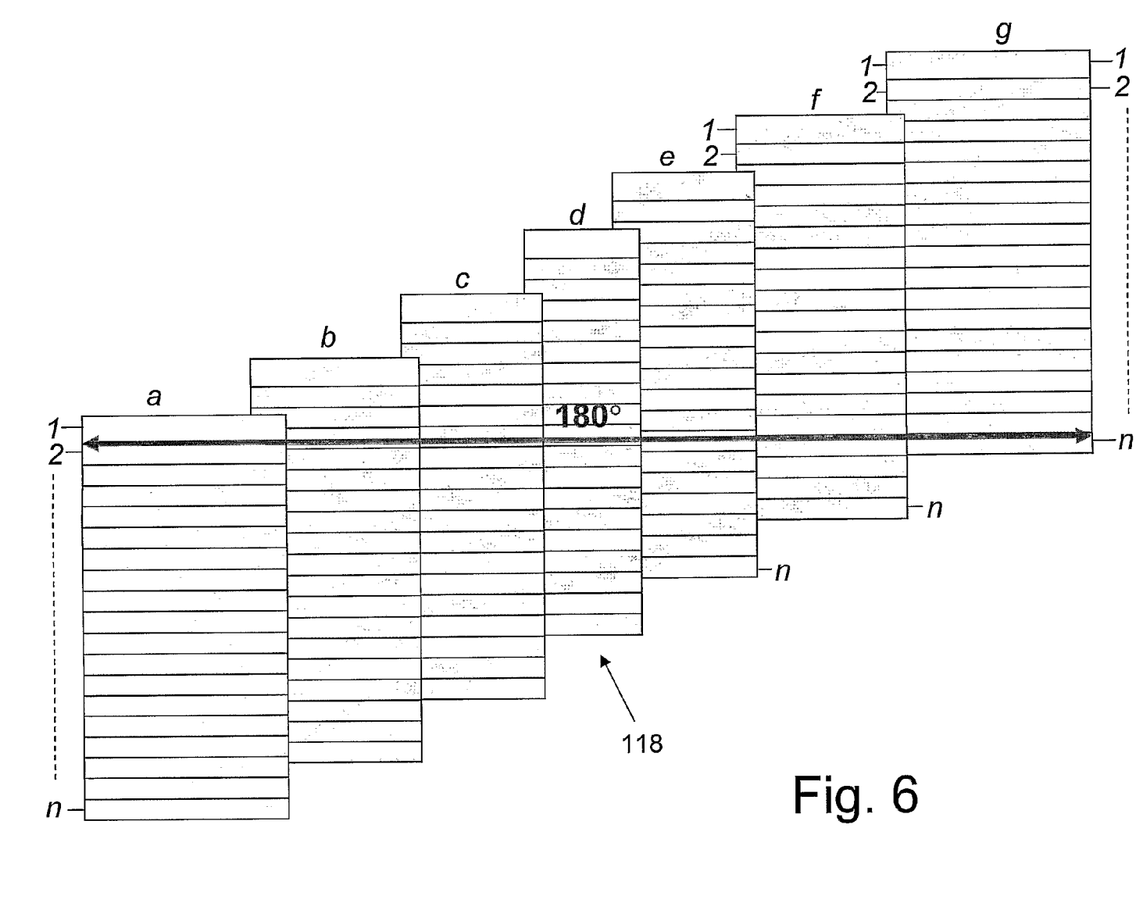
FIG. 6 illustrates a preferable manner of storing the image data as accumulated by the system of the present invention.

During the reconnaissance flight full FPA images from FPA 113 are periodically captured by a signal from FPA control 115 (FIG. 3), and conveyed to storage 118. For example, in each specific capturing time T within a period $T_1$-$T_n$ a full image, which comprises a plurality of strip images (113a-113g), is captured. Following each capturing, the plurality of strip images forming the full strip image are conveyed from FPA 113 to storage 118, and saved there. Preferably, a separate storage section is dedicated to each prism accumulation. FIG. 6 illustrates a preferable manner of storing the accumulated data. Storage 118 is divided into sections a-g, each corresponds to a specific prism 130a-130g data. In times $T_1$, $T_2$, ... $T_n$, full images are captured, and the separate image strips forming each full FPA image are stored separately, each in its corresponding storage section 118a-118g. At the end of the flight, the stored data is processed by image processing techniques, to form a full image of the whole terrain. During the image processing, consideration is given to the fact that some overlap exists between the strip images both longitudinally and transversally. Such a task can be performed by known image processing techniques. Other considerations, which are also conventional, are also made in a conventional manner.

As demonstrated, the invention eliminates the prior art need for the mechanism for changing the line of the camera sight, while still maintaining the image resolution as in the prior art. Therefore, a view and image thereof from a larger field of regard angle (Δ in the system of the present invention in comparison to θ in the prior art) can be obtained at any instantaneous time. The invention enables carrying out faster reconnaissance from a larger transversal field of regard even when the ratio of V/H is high. This latter advantage can be obtained particularly due to the total elimination of said mechanism for changing the line of sight direction, which generally slows and limits the flight speed. Furthermore, the system of the present invention comprises much less mechanism, it is much less expensive, and therefore also more reliable. In other words, images from a larger transversal field of regard can be obtained at each instant without sacrificing the image resolution.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. Airborne reconnaissance system for capturing images in a very wide field of regard, the airborne reconnaissance system comprises:
    an array of plurality of n prisms arranged one prism in front of another prism with respect to an aircraft flight direction, each prism having a triangular shape with a front surface, output surface, and a reflecting surface, each prism directs light coming from a different section of a very long strip of terrain perpendicular to the aircraft flight direction toward a front lens of an optical unit;
    a two dimensional focal plane array;
    the optical unit comprising said front lens, the front lens receiving light separately but simultaneously from said output surfaces of said plurality of prisms, said optical unit comprises additional optics for directing the light collected by said front lens toward said focal plane array, producing on said focal plane array one Image next to other separate corresponding images each relating to a different of said terrain strip sections, each of said images having a form of an elongated strip;
    control unit for periodically capturing all the images produced on the focal plane array at each instant, and transferring said all the images produced into an electronic storage; and
    processing and combining unit for processing and combining all the separate stored prism images into a full image of the terrain relating to said wide field of regard,
    wherein the airborne reconnaissance system is fully stationary relative to an aircraft in terms of angular direction of a line of sight;
    said additional optics of the optical unit comprises asymmetric elements causing an entrance pupil for an x axis parallel to the flight direction to be located far enough from the array of the plurality of n prisms thereby to obtain a satisfactory separation between beams collected from different of said terrain sections and an entrance pupil for a y axis perpendicular to the flight direction to be located close enough to the array of the plurality of n prisms thereby to enable reduction of the dimensions of the prisms; and cross-talk between any two of separate images produced on the focal plane array is eliminated by ignoring portions of the focal plane array at locations between the separate images.

2. System according to claim 1 wherein said asymmetric elements magnify more along a y axis perpendicular to the flight direction than along an x axis parallel to the flight direction.

3. System according to claim 1, wherein said asymmetric optical elements are cylindrical lenses.

4. System according to claim 1, further comprising one or more folding mirrors.

5. System according to claim 1, wherein adjacent prisms cover terrain overlap along the y axis perpendicular to flight direction.

* * * * *